United States Patent
Kim

(10) Patent No.: US 11,766,917 B2
(45) Date of Patent: Sep. 26, 2023

(54) DETACHABLE REMOTE CONTROLLER AND REMOTE CONTROLLING METHOD FOR CONTROLLING AIR CONDITIONER OF AUTONOMOUS VEHICLE

(71) Applicants: HYUNDAI MOTOR COMPANY, Seoul (KR); KIA MOTORS CORPORATION, Seoul (KR)

(72) Inventor: Jin-Han Kim, Jeollanam-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 500 days.

(21) Appl. No.: 16/857,935

(22) Filed: Apr. 24, 2020

(65) Prior Publication Data

US 2021/0178854 A1 Jun. 17, 2021

(30) Foreign Application Priority Data

Dec. 16, 2019 (KR) .................. 10-2019-0167662

(51) Int. Cl.
*B60H 1/00* (2006.01)

(52) U.S. Cl.
CPC ..... *B60H 1/00657* (2013.01); *B60H 1/00028* (2013.01)

(58) Field of Classification Search
CPC ............ B60H 1/00657; B60H 1/00028; B60H 1/008; B60H 1/00814; B60H 1/00742; B60H 1/00792; B60H 1/00849; B60R 2011/0003; B60R 2011/0045; B60R 11/0264; B60R 16/02; B60W 30/14; B60W 40/08; B60W 50/082; B60W 2040/0881; B60Y 2300/14; B60Y 2400/30; G05D 2201/0213
See application file for complete search history.

(56) References Cited

U.S. PATENT DOCUMENTS

| | | | |
|---|---|---|---|
| 9,347,716 B2 * | 5/2016 | Matsumoto | F24F 11/52 |
| 2006/0201895 A1 * | 9/2006 | Jackson | H01H 9/025 211/26.1 |
| 2007/0279245 A1 * | 12/2007 | Sholem | H01H 9/025 211/26.1 |
| 2011/0030138 A1 * | 2/2011 | Kawakami | A61G 7/165 5/2.1 |
| 2014/0034586 A1 * | 2/2014 | Eaton | H01H 9/025 211/26.1 |
| 2017/0135277 A1 * | 5/2017 | Hiramatsu | G05D 1/0242 |
| 2018/0154774 A1 * | 6/2018 | Park | G06F 3/04847 |
| 2018/0370365 A1 * | 12/2018 | Lee | B60K 37/06 |
| 2020/0372788 A1 * | 11/2020 | Dimberg | H01M 50/251 |
| 2021/0178854 A1 * | 6/2021 | Kim | B60H 1/00028 |

FOREIGN PATENT DOCUMENTS

| | | |
|---|---|---|
| CN | 104760490 A | 7/2015 |
| EP | 3333003 A1 | 6/2018 |
| WO | 2018/225439 A1 | 12/2018 |

* cited by examiner

*Primary Examiner* — Md K Talukder
(74) *Attorney, Agent, or Firm* — Fox Rothschild LLP

(57) ABSTRACT

A detachable remote controller and a remote controlling method of controlling an air conditioner of an autonomous vehicle are provided. The detachable remote controller may be configured to control the air conditioner to be detachable from a console box or a front console box by a detachment button.

2 Claims, 5 Drawing Sheets

DETACHABLE REMOTE CONTROLLER AND REMOTE CONTROLLING METHOD FOR CONTROLLING AIR CONDITIONER OF AUTONOMOUS VEHICLE

CROSS-REFERENCE TO RELATED APPLICATION

The present application claims priority to and the benefit of Korean Patent Application No. 10-2019-0167662, filed on Dec. 16, 2019, which is incorporated herein by reference in its entirety.

TECHNICAL FIELD

The present disclosure relates to a detachable remote controller and a remote controlling method of controlling an air conditioner of an autonomous vehicle. More particularly, the present disclosure relates to a detachable remote controller and a remote controlling method of controlling an air conditioner of an autonomous vehicle, which allow a user to lie down and adjust air conditioning of an interior of a vehicle through an air conditioner in accordance with an autonomous driving situation with a remote controller.

BACKGROUND

The statements in this section merely provide background information related to the present disclosure and may not constitute prior art.

An autonomous vehicle is a vehicle that finds a destination by itself without driver's manipulation of a steering wheel, an accelerator, a brake, and the like, and refers to a smart vehicle incorporating an autonomous driving technology applied to aircrafts, ships, and the like.

In order to implement the autonomous driving of a vehicle, in addition to the vehicle technologies, such as the Highway Driving Assist (HDA) technology for automatically maintaining a distance between vehicles, a Lane Departure Warning System (LDWS), a Lane Keeping Assist System (LKAS), a Blind Spot Detection (BSD) system, Advanced Smart Cruise Control (ASCC), and an Autonomous Emergency Braking (AEB) system, various advanced technologies, such as a communication technology between a vehicle and a base station and a communication technology between a vehicle and a satellite, are required.

Particularly, in the case of a general air conditioning system, a user may switch external/internal air by using a button to block external dust inflow, or artificially operate an air conditioner or increase the amount of wind of a blower.

Despite an air cleaning mode, when an internal mode is maintained for a long time, a concentration of carbon dioxide ($CO_2$) increases, so that comfort of an interior of the vehicle is decreased and a drowsiness driving problem is generated due to lack of oxygen.

Particularly, when more than two passengers ride in the vehicle, an interior carbon concentration increases compared to the case where one person drives, to cause various symptoms, such as drowsiness at first, followed by increased pulse, headache, and dizziness, due to lack of oxygen inside the vehicle.

Severe events lead to extremely dangerous events, such as convulsion or even unconsciousness events.

SUMMARY

The present disclosure allows a user to lie down and adjust air conditioning of an interior of a vehicle through an air conditioner in accordance with an autonomous driving situation with a remote controller while the user lies.

The present disclosure also provides a detachable remote controller capable of controlling an air conditioner and automatically control an air conditioner according to the attachment/detachment of the remote controller.

The present disclosure maintains an interior of the vehicle in a comfort state by measuring a concentration of carbon dioxide ($CO_2$) and operating an air purifier mode under a preset condition.

One form of the present disclosure provides a detachable remote controller for controlling an air conditioner of an autonomous vehicle, which allow a user to lie down and adjust air conditioning of an interior of the vehicle through the air conditioner in accordance with an autonomous driving situation by using the remote controller, and a control method thereof.

The detachable remote controller and the remote controlling method of controlling the air conditioner of the autonomous vehicle of the present disclosure including the foregoing configuration may achieve the following effects.

First, a user may adjust air conditioning of an interior of a vehicle in accordance with an autonomous driving situation through an air conditioner by using a remote controller while lying down.

Second, it is possible to control air conditioning of an interior of a vehicle in accordance with an autonomous driving situation, as well as improve the degree of freedom of a manipulation.

Third, the remote controller capable of controlling an air conditioner is detachable, and the air conditioner may be automatically controlled according to the detachable state of the remote controller.

Fourth, it is possible to automatically measure a carbon dioxide ($CO_2$) concentration inside the vehicle and operate an air purifier mode under a preset condition, thereby always maintaining an interior of the vehicle in a pleasant state.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
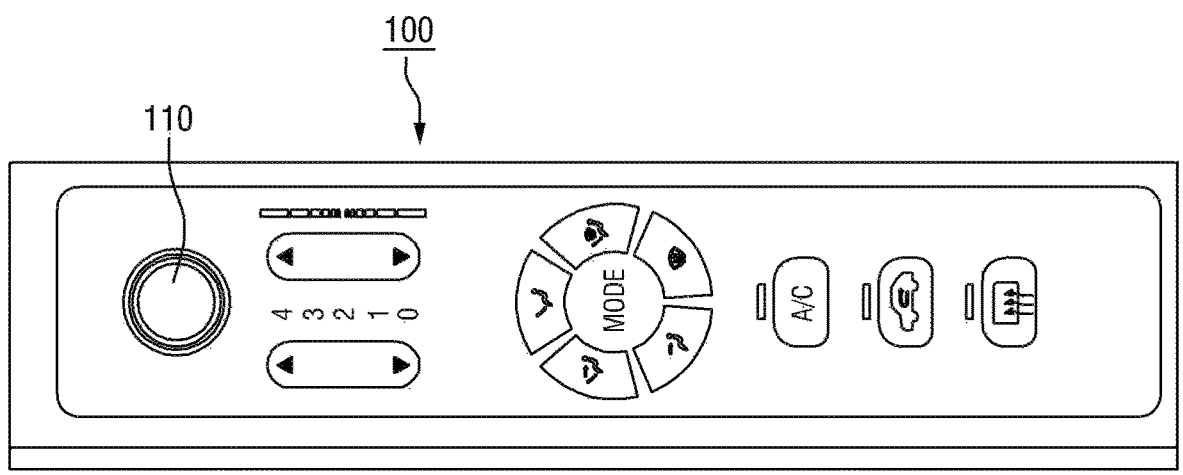
FIG. 1 is a diagram illustrating a detachable remote controller for controlling an air conditioner of an autonomous vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the accompanying drawings.

In a remote controller 100 for controlling an air conditioner of an autonomous vehicle in some forms of the present disclosure, as illustrated in FIG. 1, a detachment button 110 is installed, and buttons for adjusting hotness and coldness of the air conditioner are installed below the detachment button 110, and manipulating buttons for controlling an air volume mode of a vehicle, for automatic performance, and for external air, and the like are installed.

Figure 2:
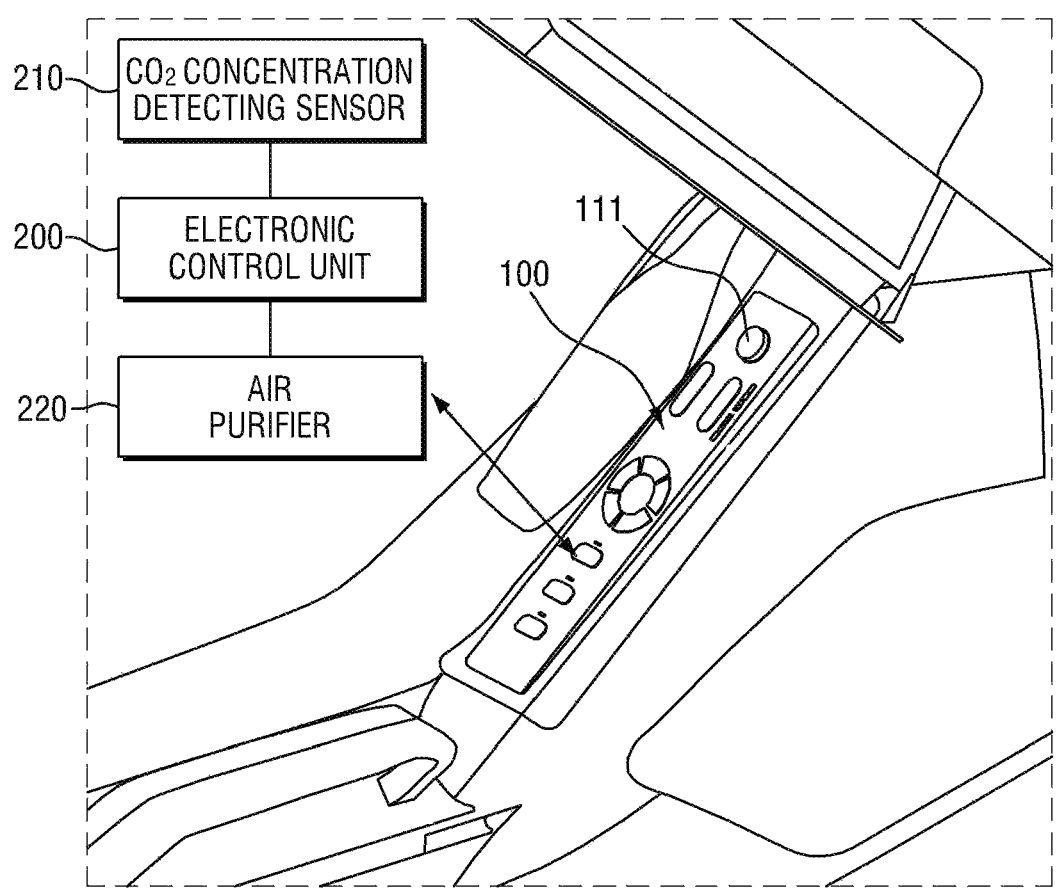
FIG. 2 is a diagram illustrating a state in which the detachable remote controller for controlling the air conditioner of the autonomous vehicle in one form of the present disclosure is installed in a front console box.

Herein, as illustrated in FIG. 2, the remote controller 100 in some forms of the present disclosure is installed to be detachable from a console box or a front console box.

Figure 3A:
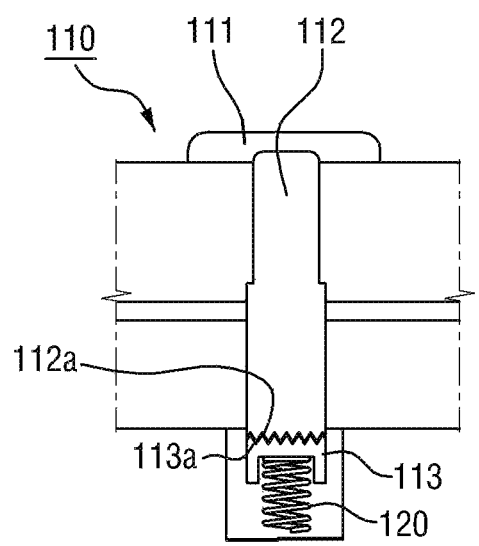
FIG. 3A is a diagram illustrating the state where the remote controller is attached.
Figure 3B:
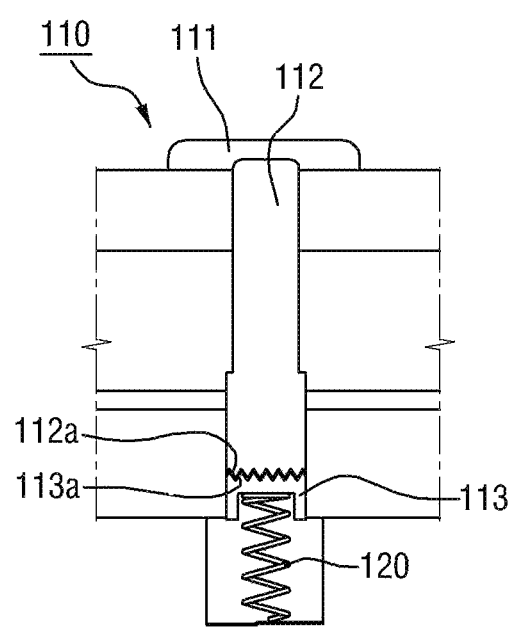
FIG. 3B is a diagram illustrating the state where the remote controller is detached from the console box by a pressing operation of the button.

The remote controller 100 is detached from the console box by the detachment button 110 as illustrated in FIG. 3A or FIG. 3B.

The remote controller 100 in some forms of the present disclosure is the remote controller 100 in the type of a generally used remote controller.

The present disclosure may check an autonomous driving mode or a direct driving mode according to a change in a detachable state of the remote controller 100. This will be described in detail below.

First, as illustrated in FIG. 3A, the detachment button 110 includes a push switch 111 installed in the remote controller 100, a first push rod 112 which is vertically operated by the pressing of the push switch 111 and having a plurality of first inclined surfaces 112a formed at one end along a circumferential surface, a second push rod 113, in which a plurality of second inclined surfaces 113a installed to be in contact with the first inclined surfaces 112a formed in the first push rod 112 is formed along the circumference surface and which is installed to face the first push rod 112, and an elastic member 120 installed in a lower portion of the second push rod 113 and elastically supported with respect to the push of the first push rod 112.

In this case, before the push of the push switch 111, the first push rod 112 and the second push rod 113 are in a lock state as illustrated in FIG. 3A, and when the first push rod 112 is pushed as illustrated in FIG. 3B, the second inclined surfaces 113a formed in the second push rod 113 pass over the first inclined surfaces 112a of the first push rod 112, and simultaneously the second push rod 113 rises by pushing-up force of the elastic member 120 and the first push rod 112 rises to release the lock. At the same time, the remote controller is separated from the console box.

Figure 4:
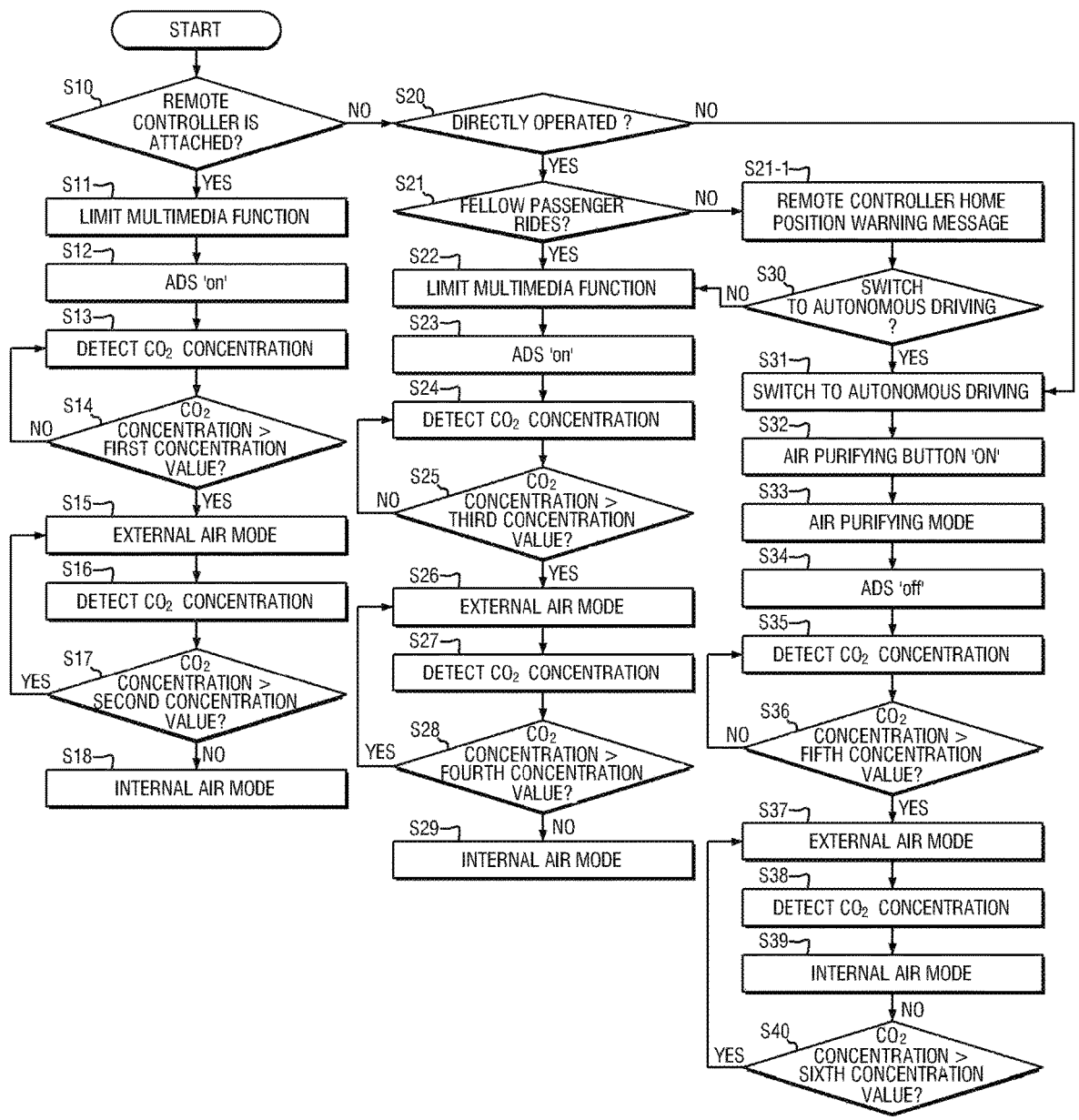
FIG. 4 is a flowchart illustrating a remote controlling method of controlling an air conditioner of an autonomous vehicle in one form of the present disclosure.

Air conditioning control logic appropriate to whether autonomous driving is operated, direct driving is performed, and a fellow passenger riding status configured as described above is controlled by operations illustrated in FIG. 4, and preferably, the control is performed by an Electronic Control Unit (ECU) of a vehicle which receives a manipulation signal from the remote controller 100 and controls air conditioning of the vehicle.

First, when the electronic control unit 200 of the vehicle determines whether the remote controller 100 is attached to the console box or the front console box (S10).

Then, when the remote controller 100 is attached, the electronic control unit 200 limits a multimedia function installed in an Audio, Video Navigation (AVN) system of the vehicle (S11), and turns on an Auto Defog System (ADS) (S12). When the remote controller 100 is detached, operations after operation S20 which is to be described below are performed.

In this case, the limitation of the multimedia function in operation S11 of the present disclosure may not be performed as necessary.

In the meantime, the ADS has a function of measuring humidity of a windshield glass of the vehicle in an air conditioner and discharging dry air to the windshield glass for securing the forward vision, and when a driver directly operates the vehicle, the ADS function may need to be performed for securing the forward vision, and when the autonomous driving of the vehicle is performed, the securing of the forward vision is not essentially required, so that the ADS function may be turned off during the autonomous driving.

Next, when the ADS is in an on state in operation S12, the electronic control unit 200 receives $CO_2$ concentration data from a $CO_2$ concentration detecting sensor 210 attached in the vehicle and detects a $CO_2$ concentration inside the vehicle (S13).

Then, the electronic control unit 200 determines whether the detected $CO_2$ concentration is larger than a preset first concentration value stored in a memory (not illustrated) linked with the electronic control unit 200 (S14).

In some forms of the present disclosure, the first concentration value is set to 1,000 ppm, and the $CO_2$ concentration exceeding the first concentration value in the state where the remote controller 100 is attached means the state that may cause drowsiness to the driver, and the setting value may be changed as necessary.

Next, when the $CO_2$ concentration inside the vehicle is larger than the preset first concentration value, the electronic control unit 200 determines that the $CO_2$ concentration inside the vehicle is high and performs an external air mode for allowing air from the outside of the vehicle to flow into the vehicle (S15).

Then, the electronic control unit 200 continuously detects the $CO_2$ concentration inside the vehicle (S16), and determines whether the $CO_2$ concentration detected after the performance of the external air mode is larger than a preset second concentration value stored in the memory (not illustrated) (S17).

In some forms of the present disclosure, the second concentration value is set to 500 ppm, and the second concentration value means the $CO_2$ concentration value at the level that does not cause drowsiness of the driver in the state where the remote controller 100 is attached, so that it is not necessary to perform the external air mode, and the setting value may be changed as necessary.

Accordingly, when the $CO_2$ concentration is larger than the second concentration value in operation S17, the electronic control unit 200 determines that the $CO_2$ concentration of the air inside the vehicle is still high and continuously performs the external air mode (S15), and when it is determined that the $CO_2$ concentration is equal to or smaller than the second concentration value in operation S17, the electronic control unit 200 determines that the $CO_2$ concentration of the air inside the vehicle is low which is a safe level and terminates the external air mode and performs an internal air mode (S18).

Next, the case where the remote controller 100 is detached as a result of the determination by the electronic control unit 200 of the vehicle whether the remote controller 100 is attached to the console box or the front console box in operation S10 will be described.

First, when it is determined that the remote controller 100 is in a detached state, the electronic control unit 200 determines whether the vehicle is currently in a direct operating state in which the vehicle is directly operated by the driver or in an autonomous driving state in which the vehicle is not directly operated by the driver (S20).

When the vehicle is in the direct operating state in operation S20, the electronic control unit 200 determines whether an additional fellow passenger rides in addition to one driver basically riding in the vehicle (S21).

In the meantime, when the vehicle is in the autonomous driving state, the electronic control unit 200 performs the control while the autonomous driving after operation S30 which will be described below.

Whether the fellow passenger rides may be determined by a publicly known riding detecting sensor, such as a load sensor, installed in a seat inside the vehicle.

In the meantime, when it is determined that there is no fellow passenger in operation S21, the electronic control unit 200 outputs a remote controller home position warning message informing the driver to attach the remote controller 100 to the console box or the front console box through a speaker or on a screen of the AVN device or a cluster (S21-1), and outputs an autonomous driving switching request message asking whether to switch the operation state to the autonomous driving (S30).

When the driver switches the operation state to the autonomous driving state according to the autonomous driving switching request message, the control in the autonomous driving state after operation S31 which is to be described below is initiated, and when the driver selects the direct operation despite the autonomous driving switching request message, the electronic control unit 200 performs operation S22 of limiting the multimedia function.

Next, when it is determined that the fellow passenger rides in operation S21, the electronic control unit 200 limits the multimedia function of the AVN system attached to the vehicle (S22) and turns on the ADS function (S23).

In this case, as described above, the multimedia function in operation S22 of the present disclosure may not be limited as necessary.

Next, when the ADS function is in an on state in operation S23, the electronic control unit 200 receives $CO_2$ concentration data from the $CO_2$ concentration detecting sensor 210 attached in the vehicle and detects a $CO_2$ concentration inside the vehicle (S24).

Then, the electronic control unit 200 determines whether the detected $CO_2$ concentration is larger than a preset third concentration value stored in the memory (not illustrated) linked with the electronic control unit 200 (S25).

In some forms of the present disclosure, the third concentration value is set to 1,000 ppm, and similar to the first concentration value, the $CO_2$ concentration exceeding the third concentration value in the state where the remote controller 100 is not attached means the state that may cause drowsiness of the driver, and the setting value may be changed as necessary.

Next, when the $CO_2$ concentration inside the vehicle is larger than the preset third concentration value, the electronic control unit 200 determines that the $CO_2$ concentration inside the vehicle is high and performs the external air mode for allowing air to flow into the vehicle from the outside of the vehicle (S26).

Then, the electronic control unit 200 continuously detects the $CO_2$ concentration inside the vehicle (S27), and determines whether the $CO_2$ concentration detected after the performance of the external air mode is larger than a preset fourth concentration value stored in the memory (not illustrated) (S28).

In some forms of the present disclosure, the fourth concentration value is set to 500 ppm, and the fourth concentration value means the $CO_2$ concentration value in the level that does not cause drowsiness to the driver in the state where the remote controller 100 is not attached, such that it is not necessary to perform the external air mode, and the setting value may be changed as necessary.

Accordingly, when the $CO_2$ concentration is larger than the fourth concentration value in operation S28, the electronic control unit 200 determines that the $CO_2$ concentration of the air inside the vehicle is still at a high level and continuously performs the external air mode (S26), and when it is determined that the $CO_2$ concentration is equal to or smaller than the fourth concentration value in operation S28, the electronic control unit 200 determines that the $CO_2$ concentration of the air inside the vehicle is low which is a safe level, and terminates the external air mode and performs the internal air mode (S29).

Next, when it is determined that the vehicle is currently in the autonomous driving state in the state where the remote controller 100 is detached in operation S20, the electronic control unit 200 switches the operation state of the vehicle to the autonomous driving mode (S31).

Then, when the travelling of the vehicle is switched to the autonomous driving mode, the electronic control unit 200 turns on an operation of an air purifier 220 attached inside the vehicle for purifying air inside the vehicle in the autonomous driving mode (S32) and performs an air purifying mode (S33) and turns off the ADS function (S34).

Then, the electronic control unit 200 receives the $CO_2$ concentration data from the $CO_2$ concentration detecting sensor 210 attached inside the vehicle and detects a $CO_2$ concentration inside the vehicle (S35).

Subsequently, the electronic control unit 200 determines whether the detected $CO_2$ concentration is larger than a preset fifth concentration value stored in the memory (not illustrated) linked with the electronic control unit 200 (S36).

In some forms of the present disclosure, the fifth concentration value is set to 2,000 ppm, and the $CO_2$ concentration exceeding the fifth concentration value in the autonomous driving state in the state where the remote controller 100 is detached means the state that may be harmful to health of the driver, and the setting value may be changed as necessary.

Next, when the $CO_2$ concentration inside the vehicle is larger than the preset fifth concentration value, the electronic control unit 200 determines that the $CO_2$ concentration inside the vehicle is at a high level to be harmful to the health of the driver and performs the external air mode for allowing air from the outside of the vehicle to flow into the vehicle (S37).

Then, the electronic control unit 200 continuously detects the $CO_2$ concentration inside the vehicle (S38), and determines whether the $CO_2$ concentration detected after the performance of the external air mode is larger than a preset sixth concentration value stored in the memory (not illustrated) (S39).

In some forms of the present disclosure, the sixth concentration value is set to 1,000 ppm, and the sixth concentration value means the $CO_2$ concentration value in the level which is not harmful to the health of the driver in the state where the remote controller 100 is detached, so that it is not necessary to perform the external air mode.

Accordingly, when the $CO_2$ concentration value is larger than the sixth concentration value in operation S39, the electronic control unit 200 determines that the $CO_2$ concentration value of the air inside the vehicle is still at a high level and continuously performs the external air mode (S37), and when it is determined that the $CO_2$ concentration value is equal to or smaller than the sixth concentration value in operation S39, the electronic control unit 200 determines that the $CO_2$ concentration of the air inside the vehicle is low and is not harmful to the health of the driver, and terminates the external air mode and performs the internal air mode (S40).

Accordingly, according to the detachable remote controller 100 for controlling the air conditioner of the autonomous vehicle and the control method thereof in some forms of the present disclosure, a driver may adjust air conditioning of an interior of the vehicle through the air conditioner so as to be suited to the driving situation with the remote controller in the autonomous driving state.

It is possible to automatically control the air conditioner according to the detachable state of the remote controller 100.

It is possible to automatically measure a carbon dioxide ($CO_2$) concentration of an interior of the vehicle and operate the air purifier mode under the preset condition, so that it is possible to always maintain the inside of the vehicle in a pleasant state.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A detachable remote controller for controlling an air conditioner of an autonomous vehicle, wherein the detachable remote controller is configured to control the air conditioner to be detachable from a console box or a front console box by a detachment button;

wherein the detachable remote controller comprises:

a push switch installed in the detachable remote controller;

a first push rod vertically operated by pressing the push switch and having a plurality of first inclined surfaces formed at one end along a circumferential surface;

a second push rod facing the first push rod, wherein the second push rod has a plurality of second inclined surfaces provided to be in contact with the plurality of the first inclined surfaces and is formed along the circumference surface; and an elastic member installed in a lower portion of the second push rod and elastically supported with respect to a push of the first push rod;

wherein:

before a push of the push switch, the first push rod and the second push rod are in a lock state;

when the first push rod is pushed, the second inclined surfaces pass over the first inclined surfaces of the first push rod, and simultaneously the second push rod rises by pushing-up force of the elastic member and the first push rod rises to release the lock; and the remote controller is separated from the console box.

2. A vehicle comprising a remote controller of claim 1.

* * * * *